UNITED STATES PATENT OFFICE.

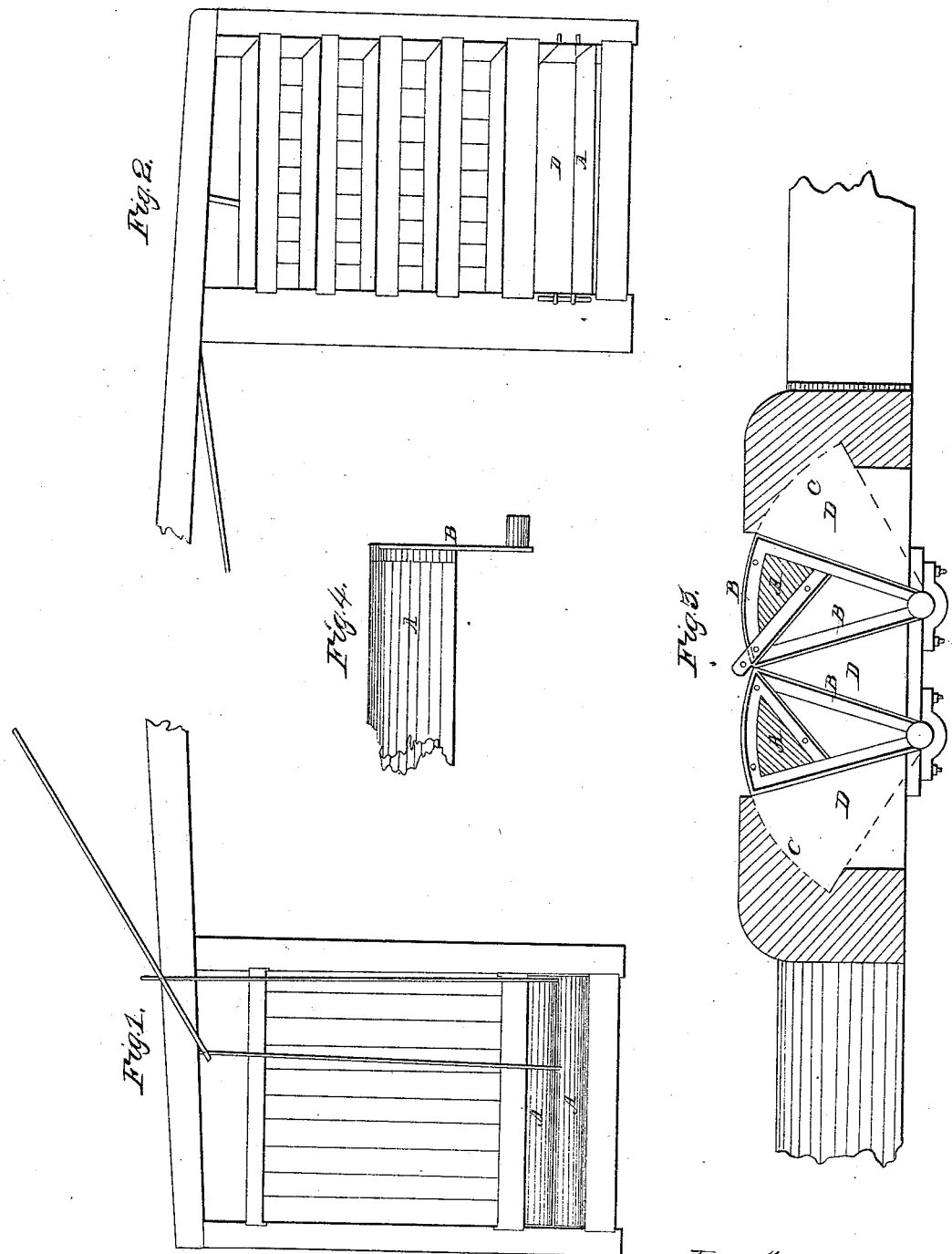

GEO. HEATH, OF LITTLE FALLS, NEW YORK.

SLUICE-GATE OF CANAL-LOCKS.

Specification of Letters Patent No. 2,393, dated December 14, 1841; Antedated July 3, 1841.

*To all whom it may concern:*

Be it known that I, GEORGE HEATH, of Little Falls, in the county of Herkimer and State of New York, have invented a new and useful hydraulic gate especially useful in the filling and emptying of locks, docks, basins, and flumes and generally in the passing and discharge of water for mill purposes or otherwise under a pressure or head.

The said improvement consists in using for the gate singly or in two parts the segment of a cylinder for the front of the gate with the radius which cuts the center line of the arch of the segment lying horizontally and with the arch next the water which is to be passed. This front of the gate rests for its support against the pressure of the water on gudgeons at the center of the cylinder which are connected with the front either by arms or by the sector of a circle at the two ends of the segment as exhibited in the plates. The front of the gate is moved by means of a lever or screw or other mechanical power attached by rods to the front of the gate by raising or depressing in doing which it turns on the gudgeons and leaves an aperture for the water to pass through.

The advantages proposed to be gained by this form of gate consists in its cheapness, its simplicity of construction, its durability, a freedom from accidents and wear and the ease by which it is opened and closed over a large aperture. The pressure of the head of water rests upon its axle or gudgeons and is overcome by the moving power with the same ease that a load of equal weight resting on a wheel hung upon its axle would be moved with a slight difference and this difference is greatest when the gates are open and when the power is applied to shut them. For practical use in locks at the upper lock gate the head is so small that this difference is scarcely perceived and at the lower gate the water is out when it is necessary to close them in order to fill the lock. When the pressure or head is considerable and the valve gate large to overcome the weight of the gate and make it move with great ease two gates may be used instead of a single gate one turning downward and the other upwards both opened by means of rods connecting them with a common lever one on each side of its fulcrum at the beam of the lock gate—in this way the weight of the one balances that of the other and they are opened and closed with perfect ease—and the two gates may be made one above the other so as to open apart and close together in one aperture or they may be placed in a horizontal line one at the end of the other with a post between them to sustain the gudgeons or bearings at the middle of the lock gate. To prevent the gates from opening too easily when closed the radius which cuts the center line of the segment may be made to incline slightly in the direction opposite that in which the circumference is to be moved in order to open it.

The most convenient and cheapest form of making and hanging this water gate is to construct the front of some hard plank of such thickness in proportion to its length as that the pressure of water will not spring it much say four inches thick for eight feet in length under ten feet head and in that proportion for greater or less length and head of water, the front of the plank should be rounded to a circumference described from the gudgeons, the arms from the gudgeons to the front plank with the gudgeon itself to be of cast iron all in one piece with a flange connecting the arms where they connect with front plank through which to fasten them to the front plank by means of bolts and nuts, this flange may be extended to any desired length along on back or flat side of the front plank to stiffen it if desired. When the expense is not of so much moment the whole front had better be of cast iron in that case the back of the front would correspond with the front in form but should be stiffened or strengthened if necessary by greater thickness of metal at the edges of the gates.

This gate may be used in flumes and other places where more convenient by reversing the relative position of the gudgeons on which it moves so as to have it hung within the flumes and its front turned toward the aperture through which the water passes, in using it for locks the better mode is as first above described having the distance from the center of the gudgeons to the front of the plank equal to the thickness of the posts of the lock gate and fastening them on the back side of those posts by means of cast iron boxes fitted to half the size of the gudgeons, the other half being let into the posts and boxes secured to the backs side of the posts by means of flanges with bolts and nuts through the posts.

What I claim as my own invention and desire to secure by Letters Patent is—

Making the gate in segments of cylinders hung upon gudgeons as hereinabove in this specification described so that the pressure of the water against the gate shall be borne by gudgeons instead of the edge of the slide as in the common sliding gate.

GEO. HEATH.

Witnesses:
 H. WOLTON,
 B. GILBERT.